Patented Dec. 30, 1952

2,623,880

UNITED STATES PATENT OFFICE

2,623,880

N-(BETA-N'-PHENYL-N'-BENZYLAMINO-ETHYL) PYRROLIDINE

Heinrich Hopff, Hermann Spaenig, and Curt Schuster, Ludwigshafen - on - the - Rhein, Germany No Drawing. Application November 21, 1949, Serial No. 128,674. In Germany December 10, 1948

1 Claim. (Cl. 260—313)

This invention relates to a particularly useful class of heterocyclic nitrogen compounds having at least 2 nitrogen atoms, one of which is a member of a heterocyclic ring system, while the other is substituted by at least one radical containing a cyclic system. The invention is also concerned with various methods for the production of the new heterocyclic nitrogen compounds.

The compounds of this invention may be represented by the general structural formula:

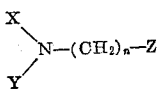

wherein X stands for a substituent containing a cyclic system, in particular for an aromatic, araliphatic or heterocyclic radical, wherein Y stands for the radical of an aliphatic hydrocarbon or a hydroxylalkyl group or has the same meaning as X, wherein Z stands for the radical of a saturated heterocyclic nitrogen compound, the nitrogen atom of which is attached to one of the CH₂-groups shown in the formula above, and wherein n stands for a whole number of at least 2, preferably between 2 and 4.

Due to this particular structure the heterocyclic nitrogen compounds of the invention have properties which make them unexpectedly superior to analogous diamine compounds containing no saturated heterocyclic radical. In the form of their salts, in particular of the hydrochloric acid salts, or in the form of the quaternary ammonium compounds, the heterocyclic nitrogen compounds of the invention show enhanced antagonistic properties against histamine. This property is particularly surprising in view of the fact that according to the prior art the replacement of dialkylamino groups in antihistaminic ω-dialkylamino ethers by heterocyclic radicals diminishes the physiologic efficiency of these products.

An especially preferred sub-group of the heterocyclic nitrogen compounds of this invention are compounds corresponding to the structural formula given above, wherein at least one of the radicals X or Y contains a mononuclear benzenoic group attached to the amino group either directly or by means of an alkylene bridge. These radicals are preferably selected from the benzene or pyridine series, and may stand, for example, for phenyl and its homologues, benzyl, β-phenylethyl, pyridyl or picolyl, while the other radical may be a lower molecular (i. e. up to 8 carbon atoms) aliphatic hydrocarbon radical, such as methyl, ethyl and/or isobutyl. The number n in this preferred sub-group of this invention should be 2 or 3, and the heterocyclic radical represented by Z should be derived from a fully hydrogenated heterocyclic from 5 to 7 membered compound containing only one nitrogen atom, such as pyrrolidine or one of its homologues, such as C-methyl pyrrolidine, piperidine, hexamethylenimine, or a heterocyclic nitrogen compound containing other hetero atoms besides the one nitrogen atom, e. g. morpholine.

A number of different methods are available for the production of the new heterocyclic nitrogen compounds of the invention. One method comprises the reaction between secondary amines of the formula:

wherein X and Y have the above identified meaning, with N-ω-halogenalkyl derivatives of heterocyclic saturated nitrogen compounds, such as N-β-chlorethylpyrrolidine. These ω-halogen compounds may be represented by the formula Hal—(CH₂)ₙ—Z, wherein halogen stands for chlorine, bromine or iodine and Z has the above identified meaning. Products of this type may be prepared by adding ethylene oxide to the compound Z—H, and replacing the ω-hydroxy group by a chlorine atom by means of thionyl chloride. The reaction between the ω-halogenated compound and secondary amine may be carried out by boiling the reaction components in an inert solvent or diluent in the presence of an alkaline substance, or by heating a mineral acid salt of the ω-halogenated heterocyclic compound with an excess of a secondary amine, preferably in the presence of copper powder.

An alternative method consists in causing n-ω-halogenalkyl derivatives of the formula:

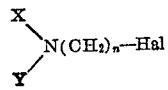

wherein X, Y, n and Hal have the above identified meaning, to react with the heterocyclic saturated nitrogen compound (Z—H) having a free nitrogen atom attached to the nuclear nitrogen atom. The reaction conditions of this method may correspond principally to those mentioned above for the first method, in particular the reaction may be carried out by starting from a mineral acid salt of the amines involved.

Another method of producing the heterocyclic nitrogen compounds of the invention is by introducing the radicals X and/or Y into primary or secondary amino compounds of the formulae

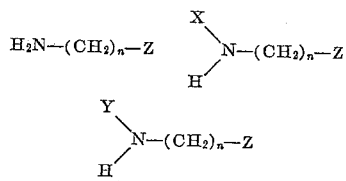

This may be performed by a treatment with the conventional alkylation agents, for example benzyl chloride.

The following examples will serve to illustrate how this invention may be carried out. The parts are by weight unless otherwise stated.

*Example 1*

A mixture of 100 parts of the hydrochloric acid salt of N-di-benzyl-N-β-chlorethyl amine with 100 parts of hexamethylene imine are heated to 200° C. for 18 hours. Aqueous caustic soda lye is added to the reaction mixture until it shows an alkaline reaction, then the mixture is extracted with ether. The extract thus obtained is subjected to a distillation. After the ether has evaporated, N-(β-di-benzylaminoethyl)-hexamethyleneimine is obtained as a main fraction, boiling at from 212 to 215° C. under 1 millimeter pressure. The hydrochloric acid salt of this nitrogen compound melts at from 164 to 166° C.

*Example 2*

A mixture of 100 parts of N-β-chlorethyl-N-benzylaniline and 100 parts of freshly distilled pyrrolidine are heated to boiling under reflux cooling for about 10 hours. Diluted aqueous caustic soda lye is added to the reaction mixture until it shows an alkaline reaction. The reaction product formed and unchanged pyrrolidine are extracted with ether and recovered from this extract in the manner described in Example 1. N - (β - N' - phenyl - N' - benzylaminoethyl) pyrrolidine boils at from 198 to 205° C. under 1 millimeter pressure. The hydrochloric acid salt melts at from 196 to 197° C. after having been recrystallized from alcohol.

*Example 3*

34 parts of N-β-chlorethylpyrrolidine-hydrochloride are dissolved together with 110 parts of N-benzylaniline in 400 parts of alcohol, and the solution is heated to boiling under reflux cooling for 15 hours, while adding 0.5 part of copper powder. After filtering off the copper powder and driving off the alcohol, dilute caustic soda solution is added until the solution shows an alkaline reaction, whereupon the oil separated is distilled in vacuo. After a forerun of excess N-benzylaniline, there passes over as a main fraction the compound described in the preceding example which boils at between 198 and 205° C under 1 millimeter pressure (mercury gauge).

*Example 4*

34 parts of N-β-chlorethylpyrrolidine hydrochloride are added to a solution of 120 parts of aniline in 500 parts of alcohol and the mixture is heated to boiling under reflux cooling for 12 hours. After rendering the mixture alkaline by adding caustic soda solution, the excess aniline is driven off with steam. The N-(β-N'-phenylaminoethyl) pyrrolidine left is fractionated in vacuo (boiling point 160 to 165° C.) 98 parts of this compound are dissolved in 250 parts of 10 per cent aqueous caustic soda solution and admixed with 65 parts of benzylchloride while vigorously stirring at from 50 to 60° C. The temperature is raised to 80 to 90° C. for 1 hour and the product worked up as indicated in the preceding examples. There is obtained the compound described in Example 2 in a 95 per cent yield.

What we claim is:

N - (β - N' - phenyl - N' - benzylaminoethyl)-pyrrolidine.

HEINRICH HOPFF.
HERMANN SPAENIG.
CURT SCHUSTER.

REFERENCES CITED

The following references are of record in the file of this patent:

FOREIGN PATENTS

| Number | Country | Date |
| --- | --- | --- |
| 604,363 | Great Britain | July 2, 1948 |

OTHER REFERENCES

Kyrides et al., J. Am. Chem. Soc., vol. 69, p. 2339 (1947).